United States Patent [19]

Thompson

[11] 4,231,699
[45] Nov. 4, 1980

[54] LOWER AND CRAWLER FRAME CONSTRUCTION FOR CRAWLER PROPELLED MACHINES

[75] Inventor: George J. Thompson, Marion, Ohio

[73] Assignee: Dresser Industries, Inc., Dallas, Tex.

[21] Appl. No.: 6,552

[22] Filed: Jan. 24, 1979

[51] Int. Cl.³ .......................... B66C 23/84; E02F 3/32
[52] U.S. Cl. .................................... 414/687; 212/253; 212/247; 280/781
[58] Field of Search .................................... 212/66–70; 414/687, 690, 693, 694; 180/6.58, 6.7, 9.2; 280/781, 793, 794

[56] References Cited

U.S. PATENT DOCUMENTS

| | | | |
|---|---|---|---|
| 1,629,890 | 5/1927 | Ronk | 280/781 |
| 2,134,866 | 11/1938 | Esters | 212/69 |
| 2,144,760 | 1/1939 | Harnischfeger | 212/69 |
| 2,739,716 | 3/1956 | Poulter | 212/69 |
| 4,037,894 | 7/1977 | Sankey | 212/69 X |

Primary Examiner—Robert G. Sheridan

Attorney, Agent, or Firm—Ward, Lalos, Leeds, Keegan & Lett

[57] ABSTRACT

A lower works construction for a machine such as a large mining shovel or dragline having a center journal and an upper frame rotatable about a vertical axis of its center journal generally consisting of a lower frame section having a housing for the center journal, a plurality of leg sections mounted on the lower frame section and projecting laterally therefrom and a pair of propelling unit support frame sections, the lower frame section having a plurality of radially projecting bulkheads emanating from the center journal housing, the leg sections having laterally projecting bulkheads disposed in registry with the radially projecting bulkheads of the lower frame section and the support frame sections having laterally projecting bulkheads disposed in registry with the laterally projecting bulkheads of the leg sections whereby vertical and radial loads applied to the upper frame and imposed on the lower frame section will be transferred through the lower frame section to the support frame sections along the bulkheads of the lower frame and leg sections.

19 Claims, 7 Drawing Figures

Fig-2

LOWER AND CRAWLER FRAME CONSTRUCTION FOR CRAWLER PROPELLED MACHINES

This invention relates to a machine frame construction and more particularly to a lower works construction of a machine having a rotatable upper frame. This invention particularly is suitable for the lower works construction of large crawler mounted mining shovels and draglines used in the mining industry.

Conventional large mining shovels of the type to which the present invention is applicable generally consist of a lower frame mounted on a pair of crawler units, a roller circle mounted on the lower frame structure, a rotatable upper frame mounted on the roller circle and a center journal mounted in the lower frame structure on the axis of the roller circle and journaled in the upper frame. Vertical and radial loads applied to the upper frame are transferred to the crawler frames through the roller circle and center journal to the lower frame and through the lower frame to the crawler frames.

Traditionally, the lower works of large crawler mounted mining shovels and draglines has consisted of an egg crate or waffle type of construction, designed to resist deflection. Such a design presents a complex loading and stress pattern in transferring the load from the upper frame to the crawler frames which results in an indeterminant and complex structure for analysis and manufacture. It thus has been found to be desirable to provide a more simple and efficient lower works construction for a machine having a rotatable upper frame having an easily identified and calculated stress pattern which will facilitate analysis and manufacture.

Accordingly, it is the principal object of the present invention to provide an improved lower works construction for a machine having a rotatable upper frame.

Another object of the present invention is to provide an improved lower works construction for a machine having a rotatable upper frame wherein vertical and radial loads imposed on the rotatable upper frame are transferred through the lower works construction to the ground.

A further object of the present invention is to provide an improved lower works construction for a machine having a rotatable upper frame mounted thereon wherein loads imposed on the upper frame are transferred through the lower works construction to the ground, easily and efficiently.

A still further object of the present invention is to provide an improved lower works construction for a machine having a roller circle mounted on the lower works construction, an upper frame rotatably mounted on the roller circle and a center journal mounted on the lower works construction and journaled in the upper frame.

Another object of the present invention is to provide an improved lower works construction for a machine having a slewing ring mounted on the lower frame construction and an upper frame mounted for rotation on the slewing ring.

A further object of the present invention is to provide an improved lower works construction for crawler mounted machines.

A still further object of the present invention is to provide an improved lower works construction for large crawler mounted mining shovels and draglines.

Another object of the present invention is to provide an improved lower works construction for a machine having a rotatable frame mounted thereon which is simple in design, provides minimal structure and has an easily identified and calculated stress pattern.

A further object of the present invention is to provide an improved lower works construction for a machine having a rotatable upper frame such as a power shovel and the like which is less costly than conventional designs to manufacture, more effective in performance and readily serviceable.

Other objects and advantages of the present invention will become more apparent to those persons having ordinary skill in the art to which the present invention pertains from the following description taken in conjunction with the accompanying drawings wherein:

Figure 1:
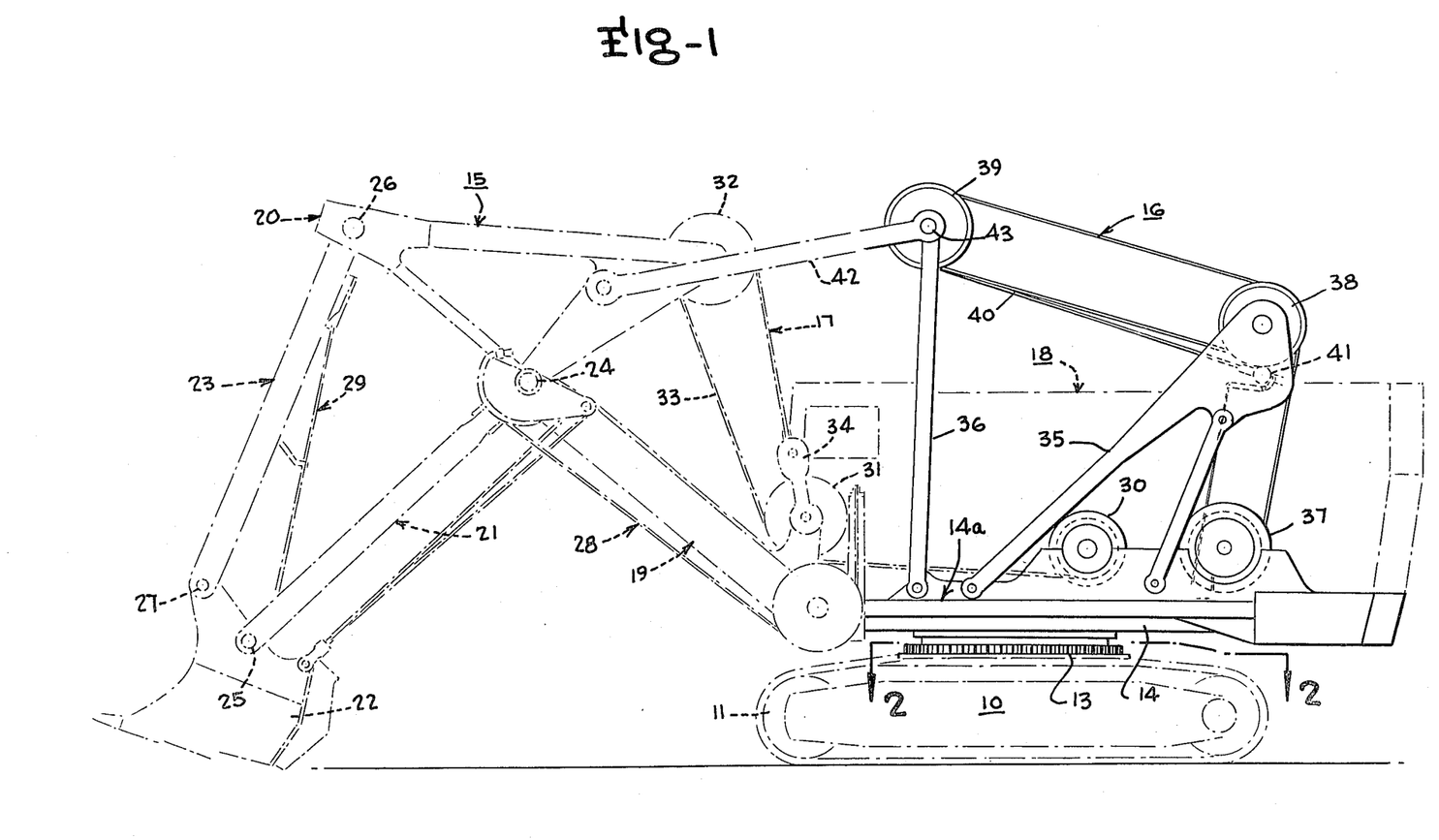
FIG. 1 is a side elevational view of a power shovel incorporating the present invention.

Referring to FIG. 1 of the drawings, there is illustrated a power shovel utilizing an embodiment of the present invention. The machine generally comprises a lower works construction 10 supported on a pair of crawler mechanisms 11 and 12, a live roller circle 13 mounted on the lower works construction, an upper frame 14 having a main deck 14a rotatably supported on the roller circle, a front end assembly 15 mounted on the front end of the upper frame, a crowd system 16 mounted on the main deck and operatively connected to the front end assembly, a hoist system 17 mounted on the front end assembly and appropriate machinery and controls mounted on the main deck for operating the crowd and hoist systems. A housing 18 also is mounted on the main deck which encloses certain structural components, the swing and propulsion machinery of the shovel and other auxiliary systems and equipment.

Front end assembly 15 generally includes a stiffleg 19, a hoist frame 20, a dipper handle 21, a dipper 22 and a hoist link 23. Stiffleg 19 consists of a structural member pivotally connected at its lower end to the front end of upper frame 14 and is provided at its upper end with a head shaft 24. Hoist frame 20 is pivotally mounted on head shaft 24. Dipper handle 21 consists of a suitable structural member and is provided with upper and lower bifurcated ends. The upper bifurcated end is connected to the hoist frame by means of a pair of connecting pins. The lower bifurcated end of the dipper handle is pivotally connected to the upper rear end of dipper 22 by means of a pair of axially aligned pins 25. The forwardly disposed head section of the hoist frame and the upper front end of the dipper are connected by hoist link 23. The upper end of the hoist link is connected to a bifurcated portion of the head section of the hoist frame by means of a connecting pin 26. The lower bifurcated end of the hoist link is connected to the dipper by means of a pair of axially aligned pins 27. It thus will be seen that hoist frame 20, dipper handle 21, dipper 22 and hoist link 23 are pivotally connected together to provide a four-bar linkage with the link comprising the hoist frame being pivotally connected to the upper end of the stiffleg by means of head shaft 24.

To provide a substantially flat pass of the dipper when it is crowded into a bank of material being excavated or loaded, there is provided on the front end assembly a pitch control system 28, the construction and operation of which is fully described in U.S. Pat. Nos. 3,501,034 and 3,648,863. In addition, the front end assembly is provided with a pitch stop assembly 29, the construction and operation of which is fully described in U.S. Pat. No. 4,085,854.

Hoist system 17 generally includes a hoist drum 30, sheaves 31 and 32 and a hoist line 33. Hoist drum 30 is mounted on main deck 14 of the machine and is driven by an electric motor through a gear train also mounted on the main deck. Sheave 31 is mounted on the lower end of stiffleg 19 in longitudinal alignment with hoist drum 30. Sheave 32 is mounted on an upper, rearward end of hoist frame 20. As illustrated in FIG. 1, hoist line 33 is wound on hoist drum 30, extends forwardly and around sheave 31, extends upwardly and around sheave 32 and extends downwardly and is connected to a bail 34 mounted on the mounting shaft of sheave 31. It further will be seen that by operating hoist drum 30 to pay out and take in hoist line 33, hoist frame 20, dipper handle 21 and hoist link 23 will be caused to pivot about head shaft 24 to correspondingly hoist and lower the dipper.

Crowd system 16 consists of a gantry 35, a mast 36, a drum 37, sheaves 38 and 39 and a crowd rope 40. Gantry 35 is mounted on the main deck along the longitudinal center line of the machine. Mast 36 consists of a structural member pivotally connected at its lower end to brackets secured to the main deck, forwardly of the vertical center line of roller circle 13. Crowd drum 37 is mounted on a frame secured to the main deck, rearwardly of hoist drum 30. Similarly to hoist drum 30, crowd drum 37 is driven by an electric motor mounted on the main deck, through a gear train also mounted on the main deck. Sheave 38 is mounted on the upper end of the gantry, substantially above crowd drum 37. Sheave 39 is mounted on the upper end of mast 36 substantially in longitudinal alignment with sheave 38. Crowd rope 30 is wound on crowd drum 37, extends upwardly and is reeved about sheaves 38 and 39 and is connected at the opposite end thereof to a bail 41 mounted on the upper end of the gantry adjacent sheave 38. A crowd link 42 is pivotally connected at the ends thereof to hoist frame 20 and a shaft 43 mounted on the upper end of the mast so that pivotal motion of the mast in a vertical plane will be transmitted by crowd link 42 to the front end assembly of the machine. It will be appreciated that by paying out and taking in crowd rope 40 mast 36 will be caused to pivot in a vertical plane and that such motion will be transmitted to the front end assembly through crowd link 42 to raise and lower the front end assembly.

Figure 2:
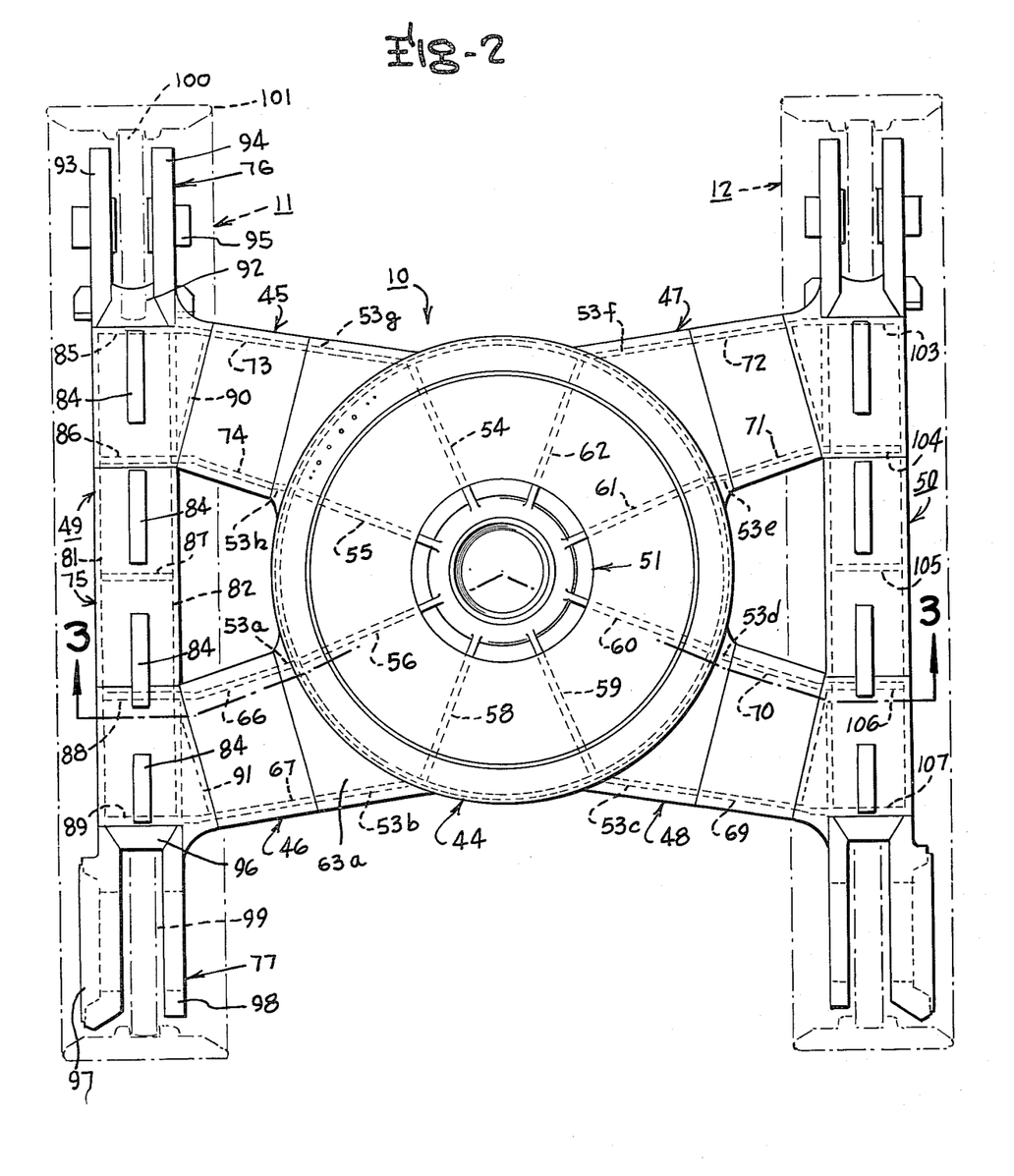
FIG. 2 is an enlarged cross-sectional view taken along line 2—2 in FIG. 1.
Figures 3, 4:
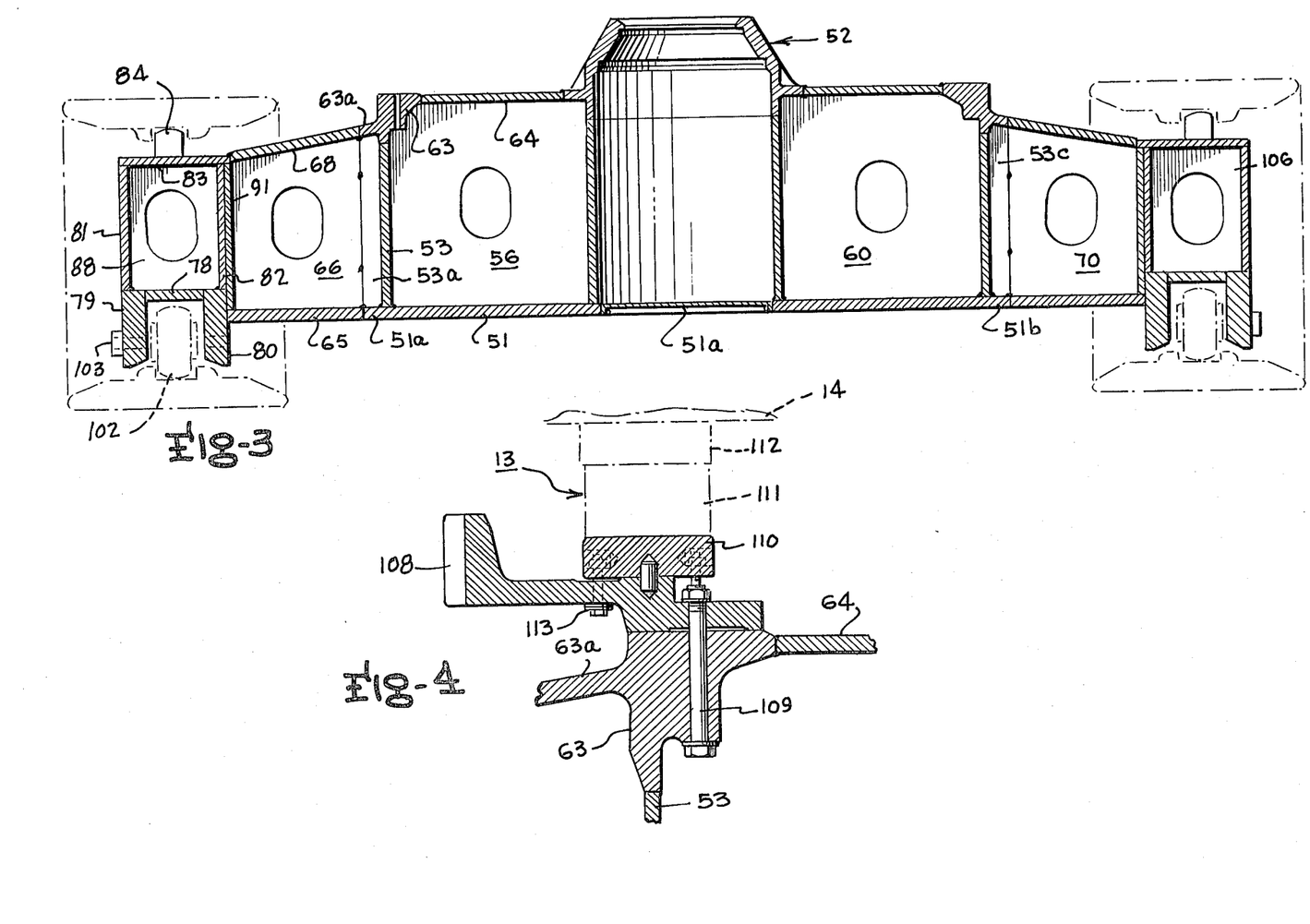
FIG. 3 is a cross-sectional view taken along line 3—3 in FIG. 2.
FIG. 4 is an enlarged, vertical cross-sectional view of a corner casting of the lower frame section shown in FIGS. 2 and 3, illustrating the positioning of the ring gear and roller circle of the machine relative to the lower frame section.

Referring to FIGS. 2 and 3, lower works construction 10 consists of a lower frame section 44, a plurality of laterally projecting leg sections 45 through 48 rigidly secured to the sides of the lower frame section, a crawler frame section 49 mounted on the ends of leg sections 45 and 46 and supported on crawler mechanism 11, an a crawler frame section 50 rigidly mounted on the outer ends of leg sections 47 and 48 and supported on crawler mechanism 12. Lower frame section 44 includes an annular bottom wall 51 having an access panel 51a, a housing 52 rigidly mounted on bottom wall 51 for accommodating a center journal operatively connected at an upper end thereof to the upper frame, a circular rib 53 rigidly mounted on the lower end thereof on bottom wall 51 and disposed concentrically relative to center pin housing 52, a plurality of radially disposed bulkheads 54 through 62 rigidly secured along their lower edges to bottom wall 51 and along their inner and outer edges to center journal housing 52 and circular rib 53, an annular corner casting 63 ridigly mounted on the upper end of circular rib 53 and the outer, upper edges of bulkheads 54 through 62, and an annular upper wall 64 rigidly secured along its inner edge to the center journal housing and along its outer edge to annular corner casting 63. Preferably, the lower portion of the center journal housing is of a formed steel construction and the upper portion thereof is formed as a casting welded on the upper end of the formed steel portion thereof. Annular corner casting 63 consists of a plurality of arcuate cast segments welded together in end-to-end relation. Bottom wall 51, circular rib 53 and upper wall 64 are formed of arcuate steel plate segments welded together and to the center journal housing, radially disposed bulkheads 54 through 62 and annular corner casting 63 to form the lower frame section.

Leg sections 45 through 48 are substantially similar in construction. Such sections are connected at their inner ends to the lower frame section and are connected at the outer ends thereof to crawler frame sections 49 and 50 as close as possible to the front and rear ends thereof to minimize bending and torsional loads in the crawler frame sections due to steering. The attachment points of the outer ends of the leg sections to the crawler frame sections are located so that moments at the ends of the crawler frame sections are equal to the moments occurring at the centers thereof. Referring to FIGS. 2 and 3, leg section 46 will be seen to consist of a laterally projecting portion 51a of bottom wall 51 of the lower frame section, a lower wall 65 forming a continuation of laterally projecting portion 51a, a set of bulkhead sections 53a and 53d rigidly secured to circular rib 53 at locations in registry with the outer ends of radially disposed ribs 56 and 58, a set of bulkheads 66 and 67 rigidly secured along their lower and inner edges to bottom wall 65 and bulkhead sections 53a and 53b, and disposed in registry with bulkhead sections 53a and 53b, a flange portion 63a of corner casting 63 and an upper wall 68 rigidly secured on the upper ends of bulkheads 66 and 67 and secured at the inner edge thereof to flange 63a. Each of bottom wall 65, bulkheads 66 and 67 and upper wall 68 is of a steel plate construction, and such plates are welded together and to bottom portion 51a, bulkhead sections 53a and 53b and casting flange 63a to form leg section 46. Similarly, leg section 48 is provided with bulkhead sections 53c and 53d which are secured to circular rib 53 and are disposed in registry with radially disposed bulkheads 59 and 60 of the lower frame section, and bulkheads 69 and 70 disposed in alignment with bulkhead sections 53c and 53d, respectively. Leg section 47 is provided with bulkhead sections 53e and 53f which are secured to circular rib 53 at locations in registry with radially disposed bulkheads 61 and 62 of the lower frame section, and bulkhead 71 and 72 disposed in registry with bulkhead sections 53e and 53f. Also, leg section 45 is provided with bulkhead sections 53g and 53h rigidly secured to circular rib 53 at locations in registry with radially disposed bulkheads 54 and 55 of the lower frame section, and bulkhead 73 and 74 which are disposed in registry with bulkhead sections 53g and 53h, respectively.

Crawler frame sections 49 and 50 are substantially similar in construction and operation. Each of such sections generally consists of a box-type beam rigidly mounted on the ends of a pair of leg sections, having a set of rollers supported on the tread of the crawler mechanism and bifurcated bracket assemblies mounted on the front and rear ends thereof for supporting idler and drive sprockets which operatively engage the tread of the crawler mechanism. Referring to FIGS. 2 and 3, crawler frame section 49 more specifically includes an intermediate, box beam portion 75, a forwardly disposed bifurcated bracket portion 76 and a rearwardly disposed bifurcated bracket portion 77. Box beam portion 75 consists of a bottom wall 78 formed with a pair of transversely spaced, depending beam members 79 and 80, a pair of transversely spaced, longitudinally disposed side walls 81 and 82, a top wall 83 having a plurality of longitudinally spaced guide lugs 84 and a plurality of longitudinally spaced, transversely disposed bulkheads 85 through 89. As best shown in FIG. 2, the inner side edges of bulkheads 85, 86, 88 and 89 engage and are connected to the outer side edges of bulkheads 73, 74, 66 and 67, respectively to form continuations of such bulkheads. The forwardly and rearwardly disposed portions of upper wall member 83 project inwardly and are connected to the top wall members of leg section 45 and 46 to form a continuity between the upper ends of the leg sections and the forwardly and rearwardly disposed ends of intermediate box beam portion 75. Such inwardly projecting portions are provided with reinforcing plates 90 and 91 which interconnect the bulkheads and are secured to the upper and lower walls of the leg sections.

Forwardly disposed bifurcated bracket portion 76 includes a base member 92 mounted on bulkhead 85 and a pair of forwardly projecting arm members 93 and 94 provided with a sprocket shaft 95. Rearwardly disposed bifurcated bracket portion 77 consists of a base member 96 rigidly mounted on bulkhead 89 and a pair of rearwardly disposed arm members 97 and 98.

Crawler mechanism 11 is mounted on crawler frame section 49 and consists generally of a drive sprocket 99, an idler sprocket 100 and a crawler tread 101. Drive sprocket 99 is mounted on a drive shaft drivingly connected to a gear reduction unit which is mounted in aligned openings in arm members 97 and 98 of bracket portion 77. The gear reduction unit, in turn, is operatively connected to a drive motor mounted either on bracket portion 77 or on the rear side of the lower frame section. Idler sprocket 100 is mounted on shaft 95. In the conventional manner, crawler tread 101 is provided with a lower flight supporting a set of rollers 102 rotatably mounted on shafts 103 carried on depending beam members 79 and 80, an upper flight guided along the length of the crawler frame section by guide lugs 84 and front and rear portions engaging idler sprocket 100 and drive sprocket 99.

Crawler frame section 50 being similar in construction to frame section 49 is provided with a plurality of bulkheads 103 through 107. As illustrated in FIG. 2, the inner sides of transverse walls 103 and 104 engage and are connected to the outer ends of bulkheads 72 and 71 of leg section 47, respectively, and the inner ends of bulkheads 106 and 107 engage and are connected to the outer ends of bulkheads 70 and 69 of leg section 48, respectively.

Referring to FIG. 4, corner casting 63 serves as a seat for ring gear 108 which consists of a plurality of arcuate gear sections secured to corner casting 63 by means of a plurality of bolts 109. Roller circle 13 is mounted on ring gear 108 and consists of a lower rail 110, a set of rollers 111 and an upper rail 112. Lower rail 110 consists of a plurality of arcuate rail segments supported on ring gear 108 and secured thereto by a plurality of bolts 113. Rollers 111 are supported on lower rail 110 and are rotatably mounted on a cage structure. Upper rail 112 is supported on rollers 111 and consists of a plurality of arcuate rail segments rigidly secured to upper frame section 14 by means of bolts. It will be appreciated that upon operation of swing drive units mounted on the upper frame section and operatively reacting with ring gear 108, the upper frame section will be caused to rotate or swing relative to the lower frame section as rollers 111 ride on lower rail 110 and upper rail 112 rides on the rollers.

At the beginning of each digging cycle of the machine as described, the crowd system is operated to fully retract the front end assembly and the hoist system is operated to lower the dipper so that the dipper is positioned adjacent the lower end of the stiffleg. To commence the operating cycle of the machine, the operator manipulates appropriate controls at the operator's station on the machine to permit the crowd rope to pay out. Under such conditions, the weight of the front end assembly will cause the stiffleg to pivot forwardly, crowding the dipper into the material being excavated or loaded. Simultaneously with the commencement of the crowding action of the dipper, appropriate controls are operated on the machine to effect limited hoisting motion of the dipper. This is accomplished by operating hoist drum 30 to take up hoist line 33. As the dipper is crowded into the bank of material, the combined crowding and hoisting action causes the dipper to make a flat pass. At the same time, pitch control system 28 causes the pitch of the dipper to remain constant relative to the ground. At the end of the crowd phase of the cycle, the pitch control system is released to cause the dipper to pitch upwardly and thus assure a full load of material in the dipper. The upward pitch of the dipper is restricted by pitch stop assembly 29 in the manner as described in the aforementioned patent relating to such system.

After the dipper has been pitched upwardly, controls for the crowd and hoist systems and swing machinery are operated to move the dipper and position it above the dump body of a hauling vehicle or other suitable repository for the material where the door of the dipper is tripped to cause the door to open and the material to be unloaded. The desired retracting motion of the front end assembly is effected by operating the motor for crowd drum 37 to take in crowd rope 40. Under such conditions, mast 36 will be caused to pivot rearwardly and such motion will be transmitted to the front end assembly causing the stiffleg to pivot upwardly.

As soon as the material has been dumped, the swing machinery can be operated to rotate the front end of the machine back to the embankment, the crowd system can be operated to continue to retract the front end assembly and the hoist system can be operated to permit the dipper handle to swing downwardly at a controlled rate until the dipper again is positioned at the lower end of the stiffleg, ready to begin another operating cycle.

During normal operating conditions of the machine, loads of varying magnitude are applied to the upper frame of the machine which are transferred to the lower frame section of the machine. Downward loads principally are transferred from the upper frame through the roller circle to the lower frame section. Upward and radial loads are transferred from the upper frame through the center journal to the lower frame section. As such loads are imposed on the lower frame section, radially disposed bulkheads 54 through 62 in the lower frame section, bulkheads 66 through 74 in the leg sections and bulkheads 85 through 89 and 103 through 107 in the crawler frame sections function to transfer such loads to the lower flights of the crawler treads and, furthermore, serve to provide the shortest distance for stress flow through the structure. Circular rib 53 of the lower frame section is utilized to carry the roller circle loads and is effective in minimizing the alternate soft and hard spots which are characteristic to conventional egg crate or waffle-type lower frame constructions. Corner casting 63 serves as a mounting pad for the ring gear thus eliminating the necessity for a specially machined pad. Such casting further permits loads to be transmitted between the lower frame and leg sections of the machine with minimum stress concentration.

Figure 5:
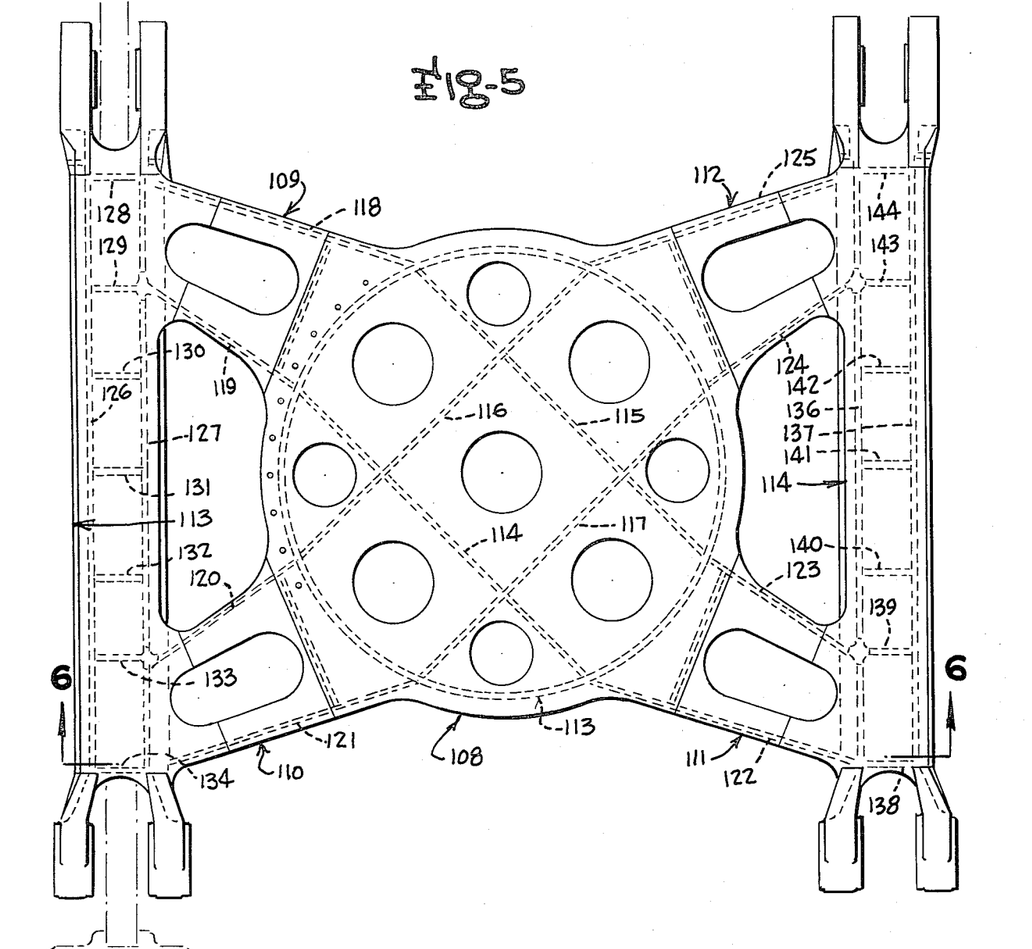
FIG. 5 is a top plan view of the lower works construction of a power shovel, similar to the view shown in FIG. 2, embodying a modification of the invention illustrated in FIGS. 1 through 4.
Figure 6:
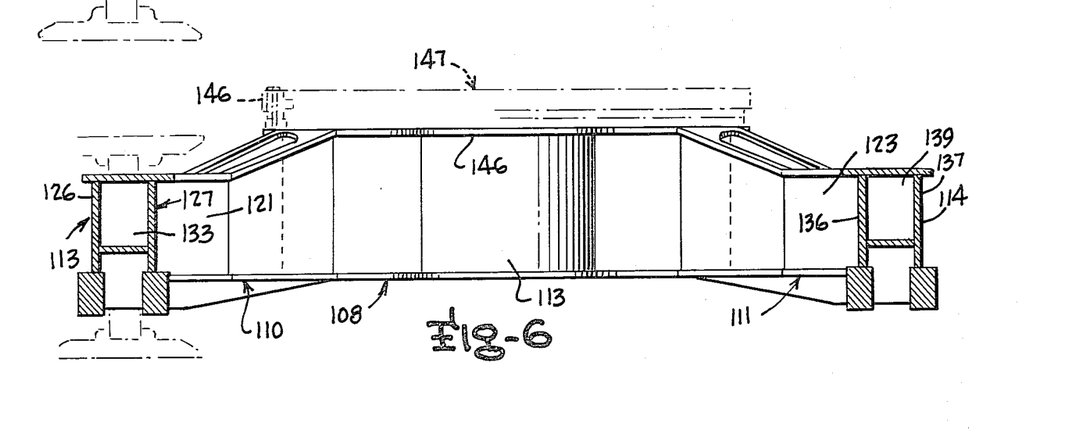
FIG. 6 is a cross-sectional view taken along line 6—6 in FIG. 5.
Figure 7:
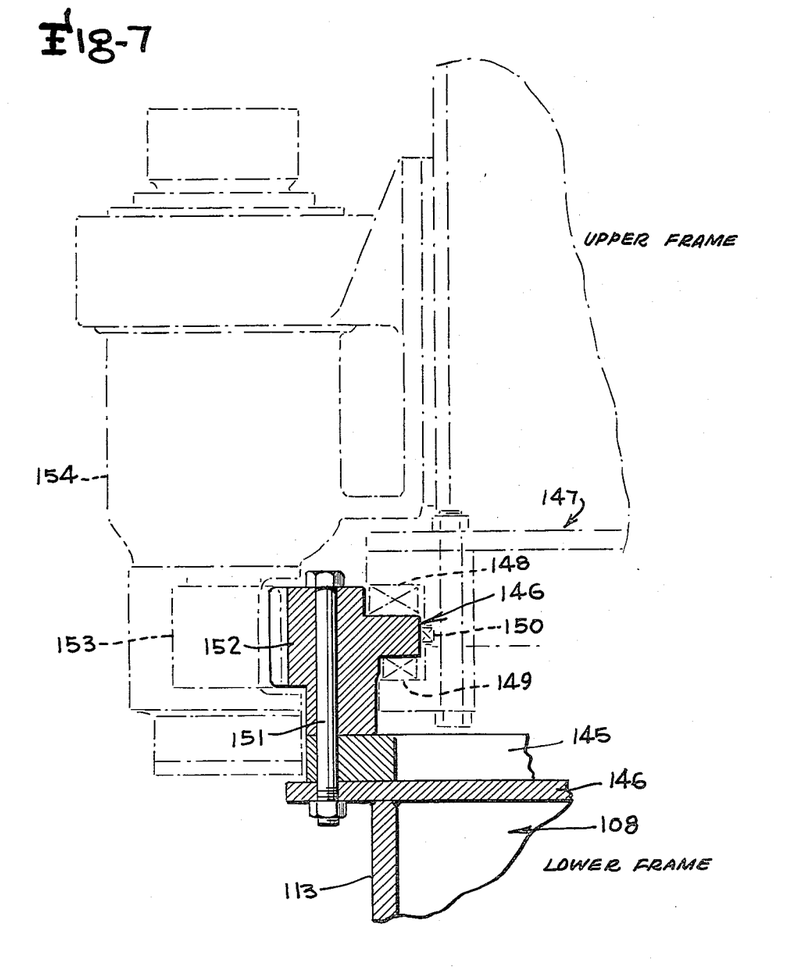
FIG. 7 is an enlarged, vertical cross-sectional view of a slewing ring utilized with the embodiment of the invention shown in FIGS. 5 and 6.

FIGS. 5 through 7 illustrate a modified form of the lower works construction shown in FIGS. 1 through 4 which is adapted to be provided with a slewing ring in lieu of a center journal and roller circle arrangement for supporting the upper frame. The modification generally includes a lower frame section 108 comparable to lower frame section 44 of the embodiment shown in FIG. 2, a plurality of radially projecting leg sections 109 through 112 rigidly secured to the sides of lower frame section 108, comparable to leg sections 45 through 48, and a pair of crawler frame sections 113 and 114, comparable to crawler frame sections 49 and 50. Referring to FIG. 5, lower frame section 108 is provided with a circular rib 113 disposed about the periphery thereof and a set of intersecting diagonal bulkheads 114 through 117 which form secants with respect to circular rib 13 and are rigidly secured at their ends of such rib. Each of leg sections 109 through 112 are provided with sets of laterally projecting bulkheads having inner ends contacting and being rigidly connected to circular rib 113 at the points of contact of diagonal bulkheads 114 through 116. In particular, it will be noted that leg section 109 is provided with a set of bulkheads 118 and 119 having the inner ends thereof disposed in registry with the ends of diagonal bulkheads 114 and 115. Leg section 110 is provided with a set of bulkheads 120 and 121 having the inner ends thereof disposed in registry with diagonal bulkheads 116 and 117. Leg section 111 is provided with a set of bulkheads 122 and 123 having the inner ends thereof disposed in registry with a set of ends of diagonal bulkheads 114 and 115, and leg section 112 is provided with a set of bulkheads 124 and 125 having the inner ends thereof disposed in registry with a set of ends of diagonal bulkheads 116 and 117.

The intermediate portion of crawler frame section 113 consists of a box-type beam including appair of transversely spaced, longitudinally disposed side wall members 126 and 127 and a plurality of longitudinally spaced, transversely disposed bulkheads 128 through 134. As best shown in FIG. 5, the inner edges of bulkheads 128 and 129 are disposed in registry with the outer ends of bulkheads 118 and 119 of leg section 109, and the inner edges of bulkheads 133 and 134 are disposed in registry with the outer ends of bulkheads 120 and 121 of leg section 110. The intermediate portion of crawler frame section 114 also consists of a box-type beam including a pair of transversely spaced, longitudinally disposed side walls 136 and 137 and a plurality of longitudinally spaced, transversely disposed bulkheads 138 through 144. The inner ends of bulkheads 138 and 139 are rigidly connected to side wall 136 at locations in registry with the outer ends of bulkheads 122 and 123 of leg section 111, and the inner ends of bulkheads 143 and 144 are rigidly connected to side wall 136 at locations in registry with the outer edges of bulkheads 124 and 125 of leg section 112. Crawler frame sections 113 and 114 are also provided with crawler mechanisms similar in construction and operation to the mechanisms described in connection with the embodiment of the invention disclosed in FIGS. 1 through 4.

Referring to FIG. 7, an annular pad 145 is mounted about the periphery of upper plate 146 of the lower frame section, above circular rib 113, on which there is seated a slewing ring 146. An upper frame 147 is rotatably mounted on the slewing ring by means of an upper set of roller bearings 148, a lower set of roller bearings 149 and an inner set of bearings 150. Vertical and radial loads applied to upper frame 147 are transmitted to the slewing ring and sequentially to circular rib 113 through roller bearings 148, 149 and 150 in the conventional manner. Slewing ring 146 and seating pad 145 are rigidly secured to the lower frame section by means of a plurality of bolts 151. Slewing ring 146 also is provided with a ring gear portion 152 which is operatively engaged by a pinion 153 of a swing drive unit 154 secured to upper frame 147. It will be appreciated that several swing drive units 154 are mounted on the upper frame and are provided with pinions 153 operatively engaging ring gear portion 153 of the slewing ring which can be operated to swing the upper frame relative to the lower frame section.

Vertical loads applied to upper frame 147 are transferred to slewing ring 146 through roller bearings 148 and 149. Radial loads applied on upper frame 147 are transferred to the slewing ring through roller bearings 150. Such loads then are transferred through seating pad 145 and upper plate 146 to circular rib 113 and then through diagonal bulkheads 114 through 116 of the lower frame section, bulkheads 118 through 125 of the leg sections, bulkheads 128, 129, 133 and 134 of crawler frame section 113 and bulkheads 139, 140, 143 and 144 of crawler frame section 114 to the lower flights of the crawler mechanisms of the machine. It will be noted that the registry of the bulkheads in the lower frame section, the leg sections and the crawler frame sections provides the shortest distance for stress flow through the structure. As described in connection with the embodiment shown in FIGS. 1 through 4, leg sections 109 through 112 are connected to the forwardmost and rearwardmost points of crawler frame sections 113 and 114 to minimize crawler bending and torsional loads caused by steering of the machine. The attachment points are located so that moments at the ends of the crawler frame sections are equal to the moments occurring at the center of such sections. Preferably, the embodiment shown in FIGS. 5 and 6 is of a welded steel construction.

The invention as described provides a lower works construction for a machine such as a power shovel which is simple in design, has minimal structure and has a stress pattern which may be easily identified and calculated. The criteria for design is fatigue stress rather than deflection which makes a lighter, more serviceable unit. The structure is more easily manufactured and is less costly than conventional frames for crawler mounted shovels and draglines, particularly larger machines having a capacity of 40 cubic yards and greater.

From the foregoing detailed description, it will be evident that there are a number of changes, adaptations and modifications of the present invention which fall within the province of those persons having ordinary skill in the art to which the present invention pertains. However, it is intended that all such variations not departing from the spirit of the invention be considered as within the scope thereof as limited solely by the appended claims.

I claim:

1. A lower works construction for a machine having a center journal and an upper frame rotatable about a vertical axis of said center journal comprising a lower frame section having a housing for said center journal, a plurality of leg sections mounted on said lower frame section and projecting laterally therefrom and a pair of propelling unit support frame sections, each mounted on the ends of a set of leg sections, said lower frame section having a plurality of radially projecting bulkheads emanating from said center journal housing, said leg sections having laterally projecting bulkheads, the inner ends of which are disposed in registry with said radially projecting bulkheads of said lower frame section and said support frame sections having laterally projecting bulkheads the inner ends of which are disposed in registry with said laterally projecting bulkheads of said leg sections whereby axial and radial loads imposed on said center journal housing will be transferred along continuous paths provided by said bulkheads to said support frame sections.

2. A lower works construction according to claim 1 wherein said sections are provided with upper and lower plate members mounted on said bulkheads.

3. A lower works construction according to claim 1 wherein said lower frame section includes a circular rib and a roller circle disposed on said circular rib for supporting said upper frame thereon.

4. A lower works construction according to claim 1 wherein the outer ends of said leg sections are connected to said support frame sections adjacent forward and rearward ends of said support frame sections.

5. A lower works construction according to claim 1 wherein said support frame sections comprise crawler frames.

6. A lower works construction according to claim 1 wherein said support frame sections comprise box-type beams.

7. A lower works construction according to claim 5 wherein said crawler frames include tread engaging sprockets and wherein the outer ends of said leg sections are connected to said crawler frames adjacent said sprockets.

8. A lower works construction according to claim 3 including a corner casting mounted on said circular rib and a ring gear mounted on said corner casting, and wherein a lower rail of said roller circle is mounted on said ring gear above said circular rib.

9. A lower works construction according to claim 1 wherein said sections are of an integral, welded construction.

10. A lower works construction for a machine having a rotatable upper frame comprising a lower frame section, a plurality of leg sections mounted on said lower frame section and projecting laterally therefrom and propel unit support frames mounted on the outer ends of said leg sections, said lower frame section having diagonally disposed bulkheads, said leg sections having laterally projecting bulkheads, the inner ends of which are disposed in registry with said diagonally disposed bulkheads of said lower frame section and said support frame sections having laterally projecting bulkheads, the inner ends of which are disposed in registry with said laterally disposed bulkheads of said leg sections whereby axial and radial loads imposed on said lower frame section will be transferred along continuous paths provided by said bulkheads to said support frame sections.

11. A lower works construction according to claim 10 wherein said sections are provided with upper and lower plate members mounted on said bulkheads.

12. A lower works construction according to claim 10 wherein said lower frame section includes a circular rib and a slewing ring disposed above said circular rib for supporting said upper frame thereon.

13. A lower works construction according to claim 12 wherein said diagonal bulkheads are connected to and form secants relative to said circular rib.

14. A lower works construction according to claim 10 wherein the outer ends of said leg sections are connected to said support frame sections adjacent forward and rearward ends of said support frame sections.

15. A lower works construction according to claim 10 wherein said support frame sections comprise crawler frames.

16. A lower works construction according to claim 10 wherein said support frame sections comprise box-type beams.

17. A lower works construction according to claim 14 wherein said crawler frames include tread engaging sprockets and wherein the outer ends of said leg sections are connected to said crawler frames adjacent said sprockets.

18. A lower works construction according to claim 12 wherein said slewing ring includes a ring gear portion engaged by pinions of swing drive units mounted on said upper frame, operable to rotate said upper frame relative to said lower frame.

19. A lower works construction according to claim 10 wherein said sections are of an integral, welded construction.

* * * * *